(12) United States Patent
Aghili et al.

(10) Patent No.: US 9,760,359 B2
(45) Date of Patent: *Sep. 12, 2017

(54) HEALTHCARE AS A SERVICE—DOWNLOADABLE ENTERPRISE APPLICATION

(71) Applicant: International Business Machines Corporation, Armonk, NY (US)

(72) Inventors: Houtan Aghili, Armonk, NY (US); Ock Kee Baek, Unionville (CA); Francisco P. Curbera, Hastings on Hudson, NY (US); Shahram Ebadollahi, White Plains, NY (US); Shubir Kapoor, Yorktown Heights, NY (US); Shilpa N. Mahatma, Mohegan Lake, NY (US); Ajay Mohindra, Yorktown Heights, NY (US); Aleksandra Mojsilovic, New York, NY (US); Gigi Y. Yuen-Reed, Tampa, FL (US)

(73) Assignee: International Business Machines Corporation, Armonk, NY (US)

(*) Notice: Subject to any disclaimer, the term of this patent is extended or adjusted under 35 U.S.C. 154(b) by 6 days.

This patent is subject to a terminal disclaimer.

(21) Appl. No.: 14/748,803

(22) Filed: Jun. 24, 2015

(65) Prior Publication Data

US 2016/0140362 A1    May 19, 2016

Related U.S. Application Data

(63) Continuation of application No. 14/680,111, filed on Apr. 7, 2015.

(Continued)

(51) Int. Cl.
*G06F 9/445* (2006.01)
*G06F 21/62* (2013.01)
(Continued)

(52) U.S. Cl.
CPC ............. *G06F 8/61* (2013.01); *G06F 21/53* (2013.01); *G06F 21/6218* (2013.01);
(Continued)

(58) Field of Classification Search
CPC ...................................................... G06F 9/445
(Continued)

(56) References Cited

U.S. PATENT DOCUMENTS 5,758,069 A * 5/1998 Olsen .................... G06F 21/121
  705/59
5,974,549 A * 10/1999 Golan .................... G06F 9/468
  714/47.3

(Continued)

FOREIGN PATENT DOCUMENTS

CN    1612138 A    5/2005
CN    100375092 C   3/2008

OTHER PUBLICATIONS

Microsoft et al., "Offlining of Business Logic and Data" Controlling Mobile Device Access to Secure Data (Jun. 19, 2008) IPCOM000171804D, IP.com, 7 pages.

(Continued)

*Primary Examiner* — Jae Jeon
(74) *Attorney, Agent, or Firm* — Scully, Scott, Murphy & Presser, P.C.; Daniel P. Morris

(57) ABSTRACT

An application as a service provided in a secure environment. A sandbox in a user's computing environment may be created. An application may be downloaded to the user's computing environment to run within the sandbox. Data sources associated with the user's computing environment may be searched and connectivity established with data registry of the data sources based on data description received with the application. The application may be run within the sandbox using the established connectivity.

(Continued)

Metering may be performed to monitor usage of the application at the user's computing environment.

5 Claims, 5 Drawing Sheets

Related U.S. Application Data

(60) Provisional application No. 62/081,273, filed on Nov. 18, 2014.

(51) Int. Cl.
    *H04L 29/08*     (2006.01)
    *G06F 21/53*     (2013.01)
    *H04W 4/00*     (2009.01)

(52) U.S. Cl.
    CPC .......... *G06F 21/6281* (2013.01); *H04L 67/34* (2013.01); *H04W 4/001* (2013.01); *H04W 4/003* (2013.01); *G06F 9/44505* (2013.01)

(58) Field of Classification Search
    USPC ................................................ 717/174–178
    See application file for complete search history.

(56) References Cited

U.S. PATENT DOCUMENTS

| | | | |
|---|---|---|---|
| 7,260,597 B1 | 8/2007 | Hofrichter et al. | |
| 8,060,464 B2 | 11/2011 | Baek | |
| 8,271,884 B1* | 9/2012 | Smaltz | G06Q 30/02 715/744 |
| 8,468,600 B1* | 6/2013 | Kaskel | G06F 21/53 726/22 |
| 8,560,709 B1* | 10/2013 | Shokhor | H04L 63/20 709/203 |
| 8,990,710 B1* | 3/2015 | Warner | G06F 8/20 715/760 |
| 2003/0163340 A1* | 8/2003 | Fitzpatrick | G06Q 30/0204 705/319 |
| 2005/0005137 A1* | 1/2005 | Benedikt | G06F 21/10 713/189 |
| 2005/0028206 A1* | 2/2005 | Cameron | H04N 7/17309 725/46 |
| 2006/0136425 A1 | 6/2006 | Baek | |
| 2007/0174915 A1* | 7/2007 | Gribble | G06F 21/53 726/24 |
| 2009/0106733 A1 | 4/2009 | Baek | |
| 2009/0198648 A1* | 8/2009 | Middleton | G06F 17/30398 |
| 2009/0210794 A1* | 8/2009 | Pendse | G06F 9/4451 715/726 |
| 2011/0153824 A1* | 6/2011 | Chikando | G06F 9/5088 709/226 |
| 2011/0179483 A1* | 7/2011 | Paterson | G06F 21/56 726/22 |
| 2011/0231363 A1* | 9/2011 | Rathod | G06F 17/30867 707/609 |
| 2012/0110156 A1* | 5/2012 | Guru | H04L 67/125 709/223 |
| 2013/0097706 A1* | 4/2013 | Titonis | G06F 21/56 726/22 |
| 2014/0007263 A1* | 1/2014 | Altman | G06F 21/60 726/30 |
| 2014/0108793 A1 | 4/2014 | Barton et al. | |
| 2015/0047046 A1* | 2/2015 | Pavlyushchik | G06F 21/577 726/25 |

OTHER PUBLICATIONS

List of IBM Patents or Patent Applications Treated as Related, dated Jun. 24, 2015, 2 pages.

Office Action dated Oct. 7, 2016 received in parent U.S. Appl. No. 14/680,111, 23 pages.

\* cited by examiner

HEALTHCARE AS A SERVICE—DOWNLOADABLE ENTERPRISE APPLICATION

FIELD

The present application relates generally to computers and computer applications, and more particularly to providing a downloadable application, for example, from software as a service computing environment to run securely in a user computing environment.

BACKGROUND

Healthcare industry is a regulated and Health Insurance Portability and Accountability Act (HIPAA) compliance industry. The security concerns hinder the adoption of public cloud computing in healthcare due to the sensitive, private nature of patient data. Healthcare industry faces a risk to data compliance violations when data is hosted outside their environment. Healthcare organizations and their business associates face heavy fines if data compliance is violated. Providing service based solutions to healthcare industry poses a daunting task.

BRIEF SUMMARY

A method and system of providing an application as a service in a secure environment may be provided. The method, in one aspect, may comprise creating a sandbox in a user's computing environment. The method may also comprise downloading an application to the user's computing environment to run within the sandbox. The method may further comprise searching data sources associated with the user's computing environment and establishing connectivity with data registry of the data sources based on data description received with the application. The method may also comprise installing the application to run within the sandbox using the established connectivity.

A system of providing an application as a service in a secure environment, in one aspect, may comprise a sandbox created in a user's computing environment. An application may be downloaded to the user's computing environment to run within the sandbox. An installation process may be operable to execute in the user's computing environment and further operable to search data sources associated with the user's computing environment and establish connectivity with data registry of the data sources based on data description received with the application. The installation process may be further operable to install the application to run within the sandbox using the established connectivity.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
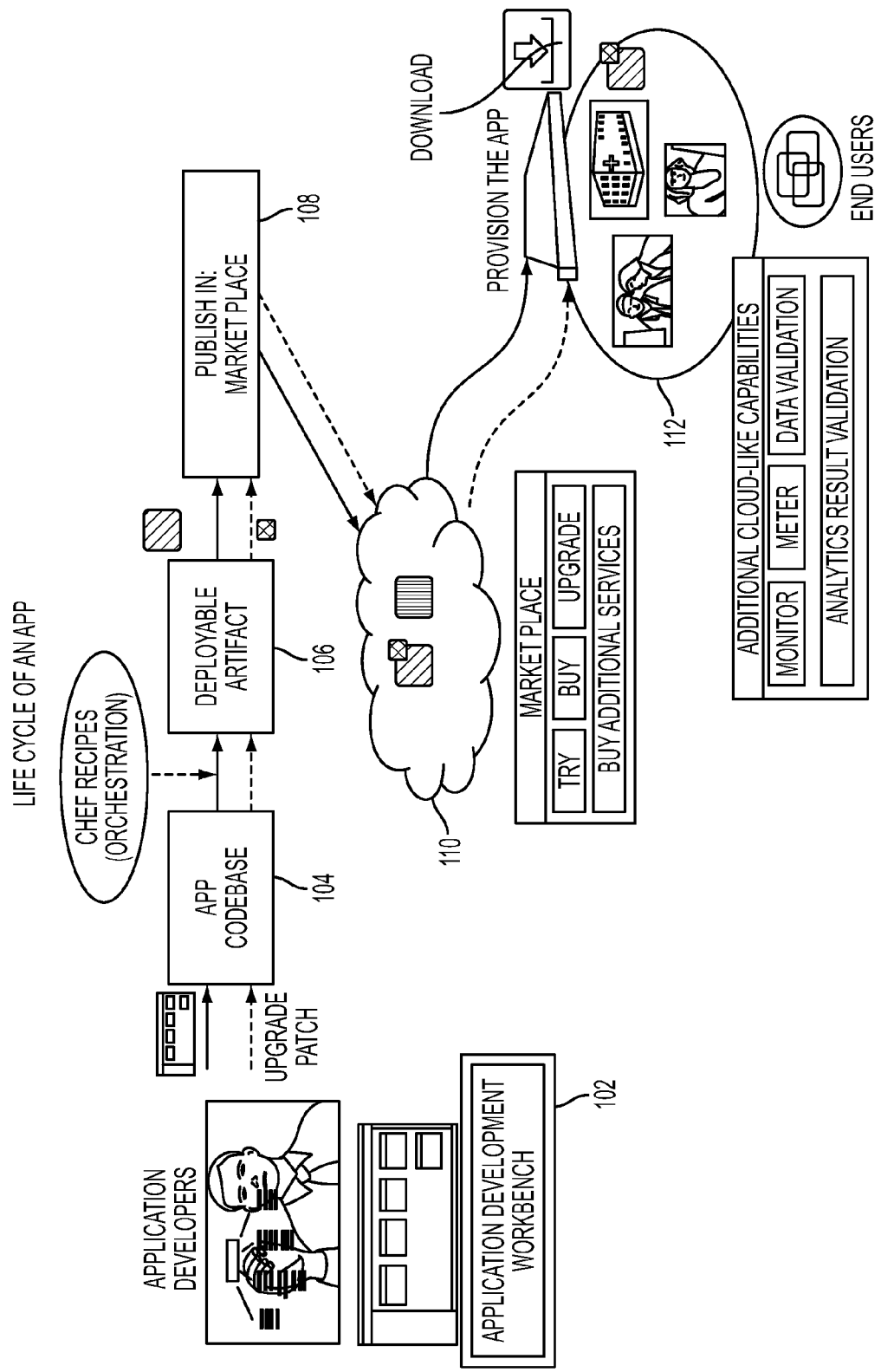
FIG. 1 is a diagram illustrating a life cycle of an application in one embodiment of the present disclosure.

Techniques are described that may address a major roadblock in adopting the cloud based applications, for example, by allowing service based applications to operate without having clients to move to a public cloud. Instead applications can migrate to the client site and run in the native or private cloud environment. Such techniques may be implemented as a system, computer-implemented method and/or embodied in a computer program product. While the system and/or methodologies described in the present disclosure may be useful in healthcare applications, they are not limited to the applications in healthcare service industry. Rather, the techniques described herein may be utilized for providing any other services or applications, for example, where security of data and running applications is desired.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. The cloud model may include different characteristics, different service models and different deployment models.

A cloud computing environment is usually service oriented with a focus on statelessnesss, low coupling, modularity, and semantic interoperability. At the heart of cloud computing is an infrastructure comprising a network of interconnected nodes. It is understood in advance that although this disclosure may includes a description on cloud computing, implementation of the teachings recited herein are not limited to a cloud computing environment. Rather, embodiments disclosed herein are capable of being implemented in conjunction with any other type of computing environment now known or later developed, as applicable.

In one embodiment, a methodology of the present disclosure may completely automate the process of downloading the application to an on premise hosted environment. In one aspect, the downloaded application may include an agent, which can run as a process on a computer, for example, a client computer. In one embodiment, the agent may create sandbox by downloading a virtual machine image to a client computer, setting up the virtual machine, and securely configuring it. A sandbox is an environment that is usually isolated from other components of a computing system, and communicates with the external world through well defined and monitored interfaces. Security software in the sandbox enforces policies that prevent unauthorized data to move out, and/or external applications to access the data. Applications or processes run in the sandbox may be restricted in what they can do. For example, the sandbox may allow for access to local data and provide a mechanism to prevent data from leaving the environment. In one aspect, the sandbox may include a protected set of computing resources (e.g., memory and disk storage) that are allocated and dedicated for a specific application. In one embodiment, the data loaded into the sandbox may be accessible only by the specific application and the specific mechanism the application uses.

The agent may install the application components such as database, visualization and analytics components. The agent may include a data harness and data description that starts to search and establish connectivity with the data registry to tap into enterprise data at the customer environment. The agent may include validation steps or processes capable of discovering the data and validating whether data requirement can be met. The agent may install one or more monitoring and metering apps (applications) that allows for "pay per use model" for the applications. Briefly, a "pay per use model" refers to a payment method in which a consumer pays a fee on per usage basis, e.g., every time the application or software is being used.

A methodology of the present disclosure in one embodiment may allow for a pay per use model to be provided at a customer environment. The methodology of the present disclosure in one embodiment may provide cost effective applications and reduce costs such as service and software costs (e.g., 20% services cost and 80% software cost). The methodology of the present disclosure in one embodiment may increase the number of application and analytics adoption. According to a methodology of the present disclosure in one embodiment, the customer data stays in their premise, and the application moves to the data. This provides a cost effective and easily deployable application, reducing the long delivery cycle of installing applications. A methodology of the present disclosure in one embodiment may allow the applications to be a part of the market place while maintaining the compliance and security of the data.

A methodology of the present disclosure in one embodiment may allow users (e.g., healthcare providers, clinical researchers) to download an application in their environment. A user or consumer can access a marketplace, (e.g., a cloud environment that may provide software as a service) to identify a set of applications the user would be interested in. The marketplace provides a framework to try and purchase a service of an application. A methodology of the present disclosure in one embodiment may also include a packaging construct that describes the data requirements for the downloaded application to run. For example, the data requirements may be described according to schemas and/or data formats.

Responsive to a user or consumer clicking on a buy or download option, a methodology of the present disclosure may trigger a set of provisioning tasks to download an application from a trusted server. Examples of provisioning tasks include installing software products and application components. A sandbox setup may be a one-time task at the user's environment, e.g., for a specific user. Provisioning tasks also include downloading an application into the user's environment (e.g., sandbox), and configuring it to work in the sandbox. An agent also instantiates an install process. The application may include a set of components, for example, visualization component, database component and analytics components.

The install process that is instantiated also runs a set of validation steps to verify, e.g., the installation process and runtime configuration parameters associated with the application. Prior to execution of the application, an agent process may perform data discovery and binding to existing data sources, e.g., enterprise data sources at the user's environment, that are needed to start using the application (also referred to as abstraction of data binding). The application is up and running after the install. The downloadable application also allows for metering, monitoring of the data consumption. In one aspect, initial setup may be performed at a user site from hardware and operating system perspective. For example, before an application can be downloaded and installed, a physical server may need to be setup and operating system may need to be installed. Further, the physical server may run a hypervisor environment, capable of running a virtual server from a virtual machine image.

FIG. 1 is a diagram illustrating a life cycle of an application in one embodiment of the present disclosure. An application may be developed by a developer, for example, using an application development workbench 102. For instance, an application code base 104 may be packaged as deployable artifacts 106 and published at a marketplace 108, for example, in a cloud computing environment 110 that offers the application to consumers or users, for example, as software as a service (SaaS). During the life cycle of an application, an application codebase 104 may be upgraded with patches, and upgraded application may be further packaged into deployable artifacts 106, and published 108 in a marketplace 110. An application development workbench 102 may include a tool that allows for creating applications and putting the applications in a marketplace 110. A marketplace 110, for example, may allow users or consumers to try, buy and/or upgrade an application as a service, and/or buy additional services. According to a methodology of the present disclosure in one embodiment, an application may be provisioned to a user's computing environment 112, and configured to run in a sandbox securely in the user's computing environment 112. A secured sandbox in one aspect provides access to customer data. An application may be installed in a sandbox automatically, for example, downloaded from a marketplace 110. A methodology of the present disclosure in one embodiment also provides one or more capabilities that can monitor and meter the usage of the application that is running within a sandbox in the user's computing environment 112, and also provides capabilities for data validation and analytics result validation.

Figure 2:
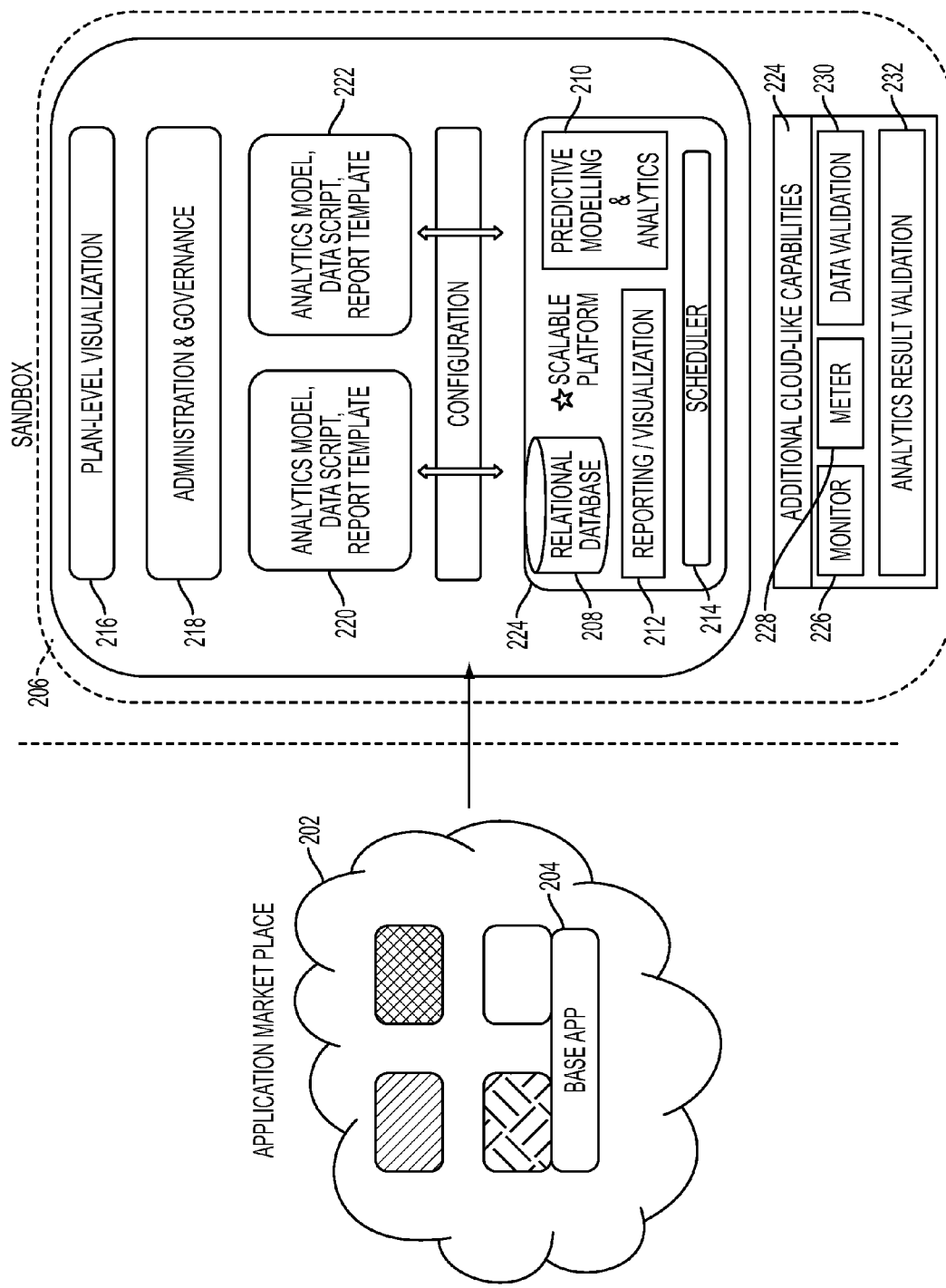
FIG. 2 is a diagram illustrating an application delivery platform in one embodiment of the present disclosure.

FIG. 2 is a diagram illustrating an application delivery platform in one embodiment of the present disclosure. The application delivery platform may also apply to delivering applications to a complex computing customer or user environment. An application marketplace 202 may provide one or more applications that may be downloaded to a user's computing environment and still yet provided as a service, for example, Software-as-a-Service (SaaS) pay per use model. An application marketplace 202 may store or include a plurality of applications (e.g., 204) and services that are made available to consumers or users. An application (e.g., 204) may be automatically downloaded with an agent module or process that securely allows access to local data and prevents the data from leaving the application environment. An application (e.g., 204) may be migrated to a client site and run in a native environment and use data available locally, on a micro cloud, or private cloud. In this way, sensitive and or private data such as health related data, credit card data, need not move to the cloud. In one embodiment of the present disclosure, an agent that is downloaded with the application (e.g., 204) may create a sandbox 206 that is secure, and install the enterprise application components. The agent includes a data harness and data description that searches and establishes connectivity with the data registry in order to access data at the customer environment. The application components may include database component (e.g., shown as relational database as an example), analytics component 210, visualization and/or reporting component 212, and/or a scheduler component 214.

The plan-level visualization component 216, administration & governance component 218, analytics model, data script, report template components 220, 222 may be executed to configure the application components (e.g., 208, 210, 212, 214) to run securely within the sandbox 206 in a user's computing environment.

In one embodiment, a sandbox 206 may accommodate a plurality of applications 224. A sandbox, for example, may be provided per server. In another embodiment, a sandbox 206 may persist in a user's computing environment, even when an application 224 is no longer running in the user's computing environment (e.g., application service is no longer provided from the marketplace).

A sandbox 206 may also include functionalities that provide cloud-like capabilities 226 such as monitoring 226, metering 228, data validation 230, and analytics result validation 232. Monitor component or functionality 226 may continuously monitor the applications running in the sandbox. This mechanism in one embodiment may help to keep the applications up and running and provides real time alerts for fast resolution. Metering component 228 measures or computes the application usage, for example, for payment purposes, to allow paying for the application as a service. Data validation component or functionality 230 may discover and validate data requirements. For example, based on the data description requirement that is packaged with the application, the data validation component 230 may discover data in the enterprise data sources and validate to determine whether the enterprise data sources include the required data to run the application properly. For example, the data validation component 230 may use validation rules defined in the data dictionary of an application and validate rules such as valid data types, range and structure validation. Data discovery component searches against a pre-defined data directory and discovers the data. Analytics result validation component or functionality 232 may generate results such as prediction of future values and/or identify patterns from a dataset. Analytics validation component 232 helps to verify that the patterns that are produced by the analytics occur in the wider data set and is not biased.

The components or elements deployed in the sandbox 206 are executable components that run on one or more hardware processors. In one aspect, the monitoring component 226 may send the monitoring and metering information back to the cloud.

Figure 3:
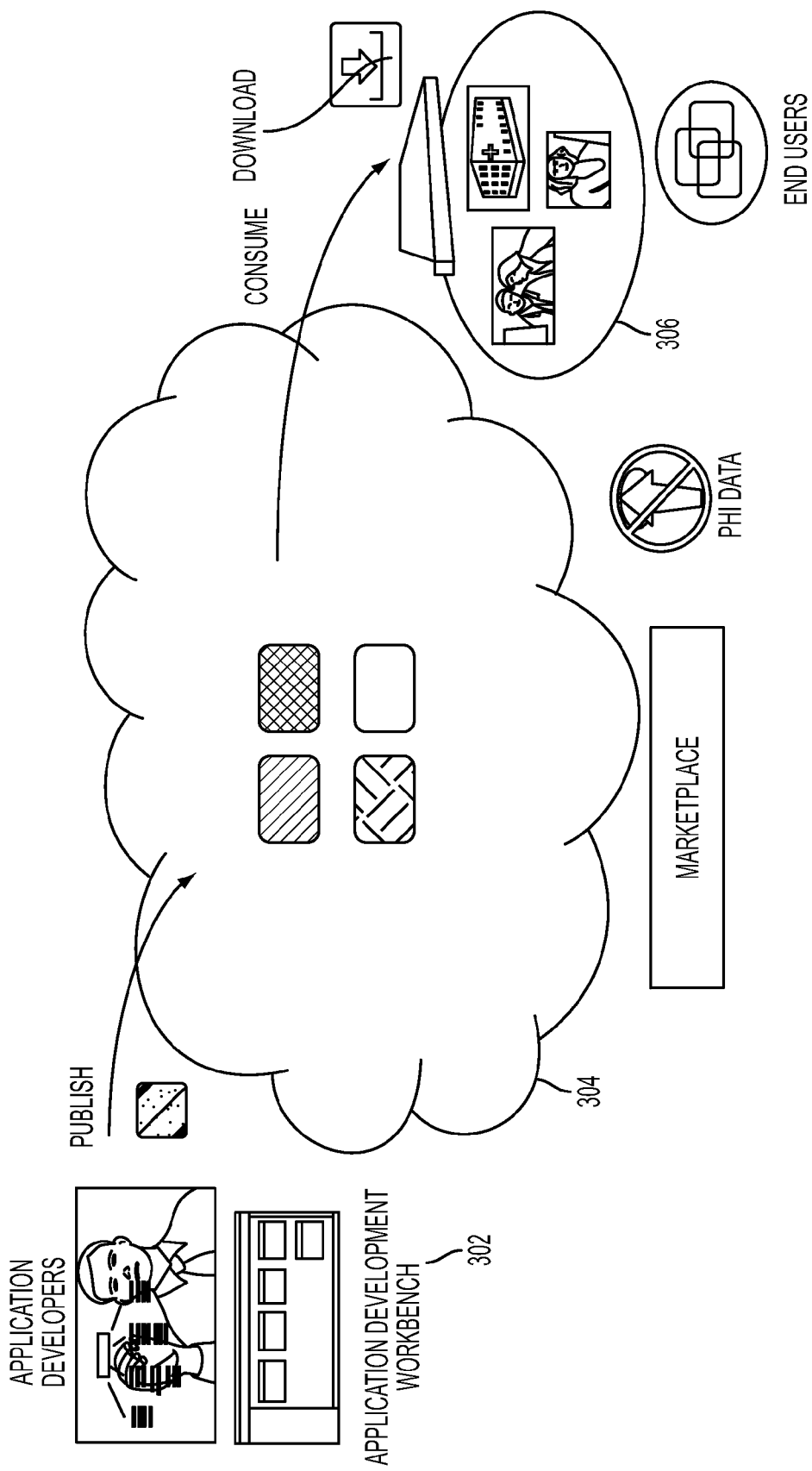
FIG. 3 is a diagram showing an application marketplace and delivery platform in one embodiment of the present disclosure.

FIG. 3 is a diagram showing an application marketplace and delivery platform in one embodiment of the present disclosure. A developer may write or develop an application using a tool such as an application development workbench 302, and publish the application to a marketplace, e.g., cloud computing environment that offers applications as a service to a consumer or user 306. In one embodiment of the present disclosure as described above, one or more applications offered as a service may be downloaded from a marketplace 304 and run in a user's private computing environment securely, e.g., according to a sandbox methodology described with reference to FIG. 2.

Figure 4:
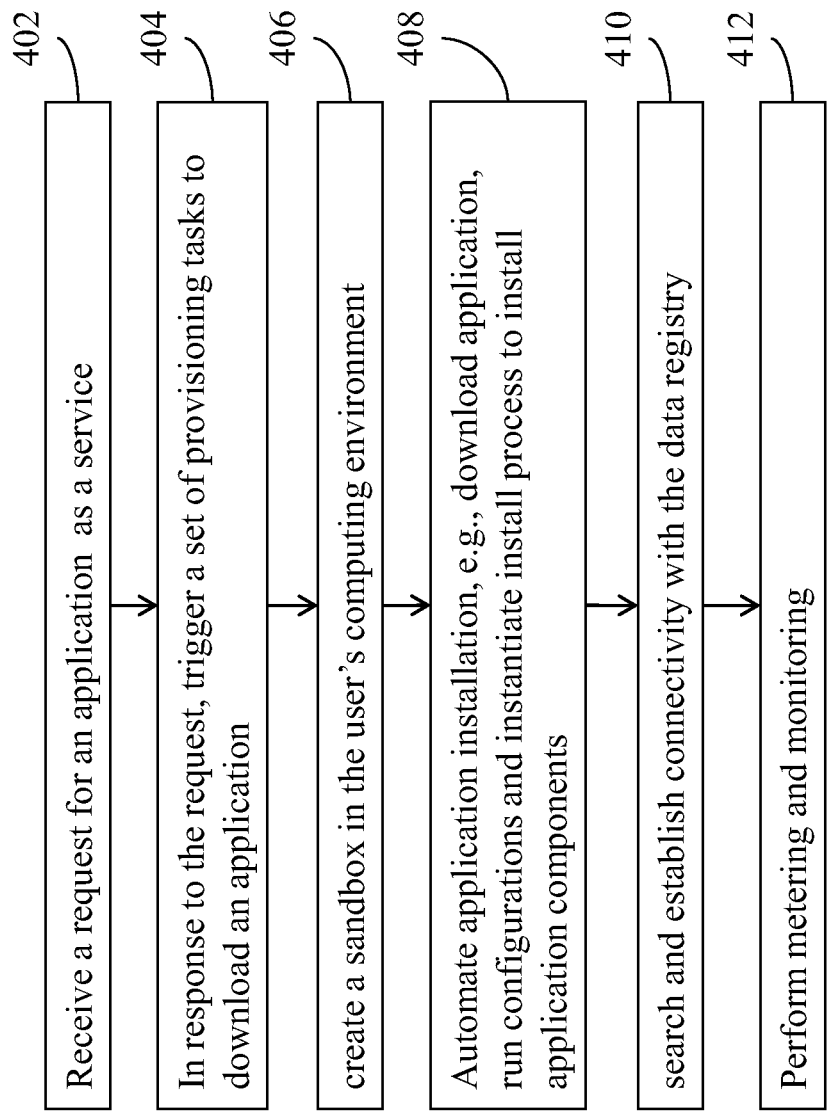
FIG. 4 is a flow diagram illustrating a method that automates application download and providing it as a service, in one embodiment of the present disclosure.

FIG. 4 is a flow diagram illustrating a method of providing an application as a service securely in one embodiment of the present disclosure. The method in one embodiment automates application download and provides it as a service. At 402, a request for an application is received. For example, a request from a consumer or user to purchase an application to use as a service may be received at a computing environment that is providing a marketplace for offering one or more applications as a service. A user interface or like tool may be provided to the user for entering or selecting one or more applications to purchase and use as a service. For example, a browser or a web interface may be provided to a computing environment implementing the marketplace.

At 404, in response to the request, a set of provisioning tasks may be triggered to download the application. For example, at 406, a sandbox is created at the user's site, (e.g., user's computing environment that includes one or more processors and memory and other devices). In one embodiment, a sandbox includes a set of virtual machines.

The application includes an agent process that is triggered to create a secure sandbox in the user's computing environment and provision the application to run in the user's computing environment securely using the user's data. For example, in one embodiment, an agent component may be downloaded to the user's site and the agent runs to create a sandbox and instantiate installation and configuration of an application.

At 408, installation and instantiation of the application is automated. For example, the application is downloaded and configurations are setup to instantiate an install process for installing the application on the user's computing environment. For example, a set of relevant application components or parts may be downloaded into the sandbox designated to a user, the application components/parts may be dynamically composed, runtime configuration parameters may be applied, and the application may be initiated or invoked for execution within the designated and protected sandbox. Application components may include database, visualization and analytics components.

At 410, the method may include searching through existing data connectivity and tapping into enterprise data at the user's computing environment. For example, a data harness and data description component that is included in the application may search and establish connectivity with the data registry to tap into enterprise data at the user's computing environment.

Figure 5:
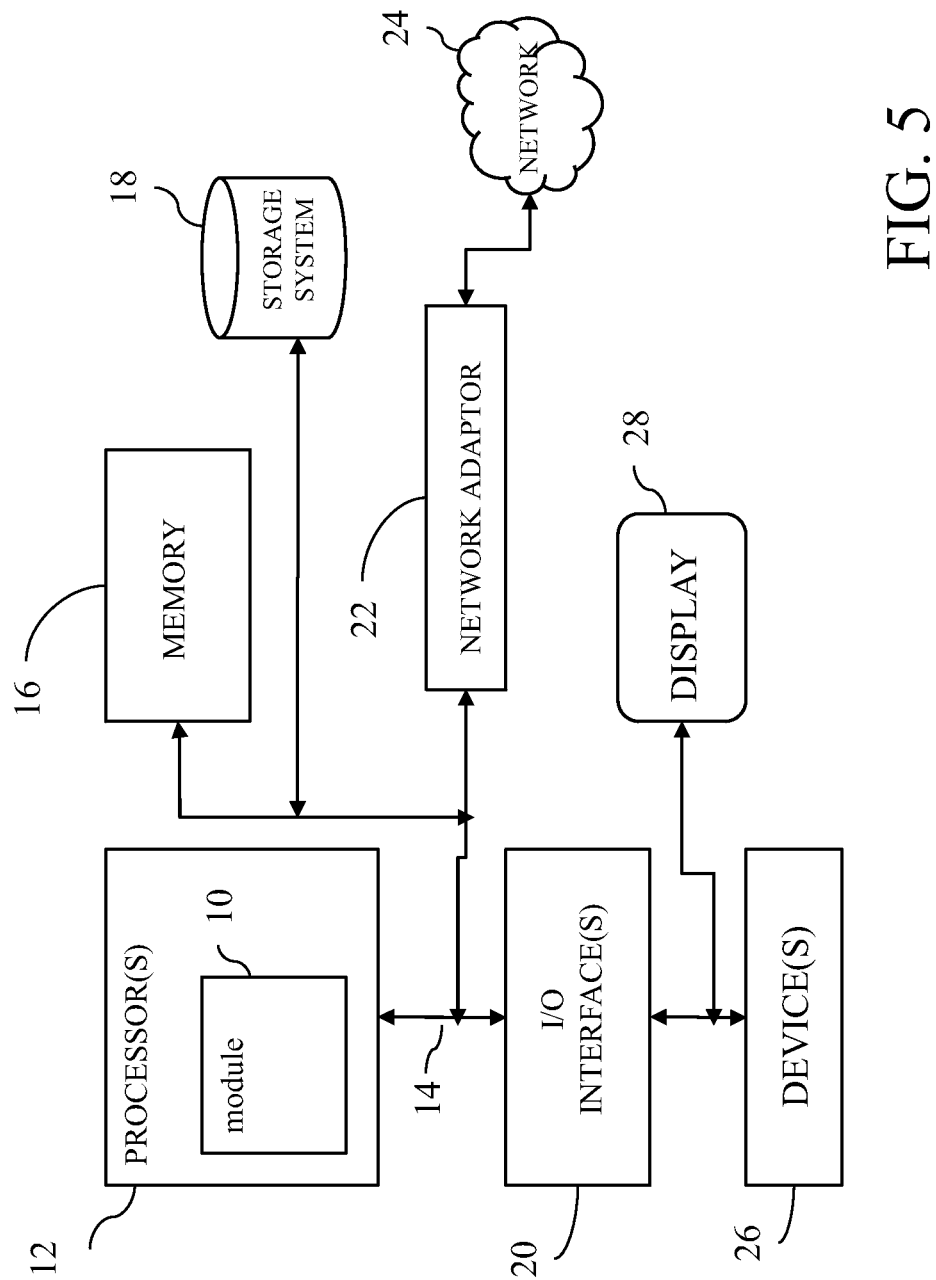
FIG. 5 illustrates a schematic of an example computer or processing system that may implement a secure application provisioning system in one embodiment of the present disclosure.

FIG. 5 illustrates a schematic of an example computer or processing system that may implement a secure application provisioning system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of providing an application as a service in a secure environment, comprising:
    creating a sandbox in a user's computing environment, responsive to a request made to a computing environment that provides a marketplace for offering an application as a service:
    downloading the application to the user's computing environment to run within the sandbox;
    searching data sources associated with the user's computing environment; based on data description received with the application, establishing connectivity with data registry of the data sources; installing the application to run within the sandbox using the established connectivity, wherein the sandbox allows access to data local to the user's computing environment and prevents the data local to the user's computing environment moving to the computing environment; and
    automatically validating an installation of the application by discovering data specified in the data description in the data sources and determining whether the data specified in the data description exist in the data sources.

2. The method of claim 1, further comprising: metering usage of the application at the user's computing environment.

3. The method of claim 1, wherein the application comprises database, visualization and analytics components.

4. The method of claim 1, wherein the application is downloaded from a computing environment that provides the application as SaaS.

5. The method of claim 1, wherein a user interface is provided for allowing a user to enter the application to use as service.

* * * * *